United States Patent [19]

Wen et al.

[11] Patent Number: 4,742,354

[45] Date of Patent: May 3, 1988

[54] RADAR TRANSCEIVER EMPLOYING CIRCULARLY POLARIZED WAVEFORMS

[75] Inventors: Cheng P. Wen, Mission Viejo; Trang N. Trinh, Torrance, both of Calif.

[73] Assignee: Hughes Aircraft Company, Los Angeles, Calif.

[21] Appl. No.: 894,526

[22] Filed: Aug. 8, 1986

[51] Int. Cl.[4] .......................... G01S 7/42; H04B 7/10; H01Q 21/24; H01P 5/18

[52] U.S. Cl. .................................. 342/188; 342/365; 343/700 MS; 333/116; 455/86

[58] Field of Search ........ 342/188, 198, 175, 361–366; 343/700 MS, 850; 333/116; 455/73, 78, 81, 82, 86

[56] References Cited

U.S. PATENT DOCUMENTS

| | | | |
|---|---|---|---|
| 3,019,430 | 1/1962 | Pedersen et al. | 342/188 X |
| 3,478,362 | 11/1969 | Ricardi et al. | 343/700 MS X |
| 3,921,177 | 11/1975 | Munson | 343/700 MS |
| 4,180,817 | 12/1979 | Sanford | 343/700 MS |
| 4,217,549 | 8/1980 | Henoch | 342/365 X |

FOREIGN PATENT DOCUMENTS

| | | | |
|---|---|---|---|
| 0071069 | 2/1983 | European Pat. Off. | 342/365 |
| 0217702 | 10/1985 | Japan | 342/365 |
| 0302810 | 4/1971 | U.S.S.R. | 342/361 |

OTHER PUBLICATIONS

M. I. Skolnik, *Intro. to Radar Systems*, 1980, pp. 70–72.

*Primary Examiner*—T. H. Tubbesing
*Assistant Examiner*—Gilberto Barrón, Jr.
*Attorney, Agent, or Firm*—Terje Gudmestad; Paul M. Coble; A. W. Karambelas

[57] ABSTRACT

A radar transceiver is disclosed which operates with circularly polarized waveforms. A single circularly polarized antenna is used to transmit and receive circularly polarized waveforms. A 3-dB directional coupler splits the signal to be transmitted into two signals 90° out-of-phase for transmission by the antenna and also combines the horizontal and vertical components of any return signal.

2 Claims, 2 Drawing Sheets

RADAR TRANSCEIVER EMPLOYING CIRCULARLY POLARIZED WAVEFORMS

BACKGROUND OF THE INVENTION

1. Field of the Invention

The present invention relates to radar and, more particularly, is concerned with radar transceivers employing circularly polarized waveforms.

Most objects reflect radio waves. Radar systems detect reflected radio waves to "see" objects such as aircraft, ships, vehicles, structures, and automobiles during the day or night through rain, fog or clouds. A classic radar system consists of a radio transmitter, radio receiver, two antennas, and a display. A radar system having both a transmitter and a receiver is called a radio transceiver. The radio transmitter generates continuous or pulsed radio waves by a voltage controlled oscillator. The radio waves are in turn radiated by one of the two antennas. Portions of the transmitted waves that are reflected back from objects are picked up by the other antenna and translated in the receiver by a mixer from their microwave frequency to a lower intermediate frequency for further signal processing. Because this radar transceiver employs two antennas, however, it is large and heavy. Furthermore, receiver sensitivity is seriously degraded if the reflected signal has the same polarization as the transmitted signal. This sensitivity reduction must be compensated with an increased transmitter power.

Another conventional radar system employes a circulator which permits the use of a single antenna for both receiving and transmitting. A voltage controlled oscillator generates a continuous wave signal which is directed to the antenna through the circulator. The single antenna radiates a microwave signal and receives the return echos. The return signals are directed through the circulator to a mixer where the signal is reduced in frequency for further signal processing. The magnetic materials such as ferrite used in a circulator, however, are not compatible with monolithic integrated circuits. The circulator is also susceptible to shock and vibration.

A further single antenna radar system developed can eliminate the circulator. A signal generated by a voltage controlled oscillator is fed into a 3-dB branch line coupler. A linear antenna is connected to the second branch of the coupler while the third branch of the coupler is terminated. Therefore, half of the generated signal passes through the coupler to the antenna while the other half of the signal is dumped at the third branch. The linear antenna radiates the signal from the second branch and receives any return signal. The return signal enters the second branch of the coupler and is split in two, one-half of which is directed toward a mixer, the other half of which is directed toward the signal generator and thus not used. Although this configuration has the advantage of using one antenna, about three-quarters of the power is wasted in operation.

SUMMARY OF THE INVENTION

It is therefore an object of the present invention to provide a simple and inexpensive radar transceiver.

It is a further object of the present invention to provide a radar transceiver that is compact and lightweight that can be manufactured on a single substrate and be entirely monolithic.

It is yet another object of the present invention to provide a transceiver that is efficient.

In accordance with the foregoing objects, a radar transceiver according to the present invention includes a transmitter oscillator for generating a signal, a directional coupler that splits the generated signal into two signals of about equal amplitude but 90° out-of-phase, and a single antenna for radiating these two signals as a circularly polarized waveform. Any portion of the transmitted circularly polarized waveform that may be reflected back will be received by the same antenna. The directional coupler combines the two components of the circularly polarized wave into a single signal which is down-converted to an intermediate frequency by a mixer.

Other and further objects, advantages, and characteristic features of the present invention will become readily apparent from the following detailed description of a preferred embodiment of the invention when considered in conjunction with the accompanying drawings.

DESCRIPTION OF THE PREFERRED EMBODIMENT

Figure 1:
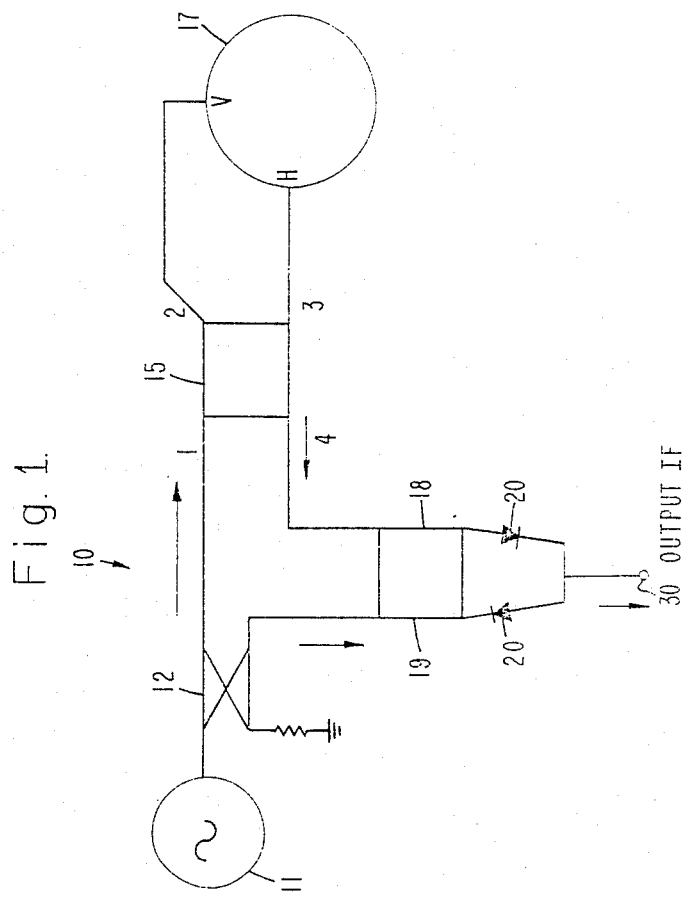
FIG. 1 is a schematic diagram of a radar transceiver according to the invention.

Referring now with greater particularity to FIG. 1, a radar transceiver 10 according to the present invention may be seen to include a transmitter oscillator 11 for generating a signal. A voltage controlled Gunn oscillator using either a beam lead or a package varactor diode as a power source may be used, for example. The generated signal may be continuous or pulsed. The signal is fed into a power splitter 12 such as a directional coupler or a hybrid coupler which splits the signal into two portions, one portion being of sufficient power to drive a mixer and the remaining portion being the signal to be transmitted. Alternatively, a local oscillator may be used to provide the local oscillator signal for the mixer.

The signal to be transmitted is thereafter fed into a directional coupler 15 which may be a 3-dB coupler that will split this signal into two signals of about the same amplitude but about 90° out-of-phase, such as a 3-dB branch line coupler, a Lange coupler, or a lumped element, for example. The directional coupler 15 generally has four ports as indicated by numerals 1, 2, 3 and 4 in FIG. 1. The signal to be transmitted enters port 1 of the directional coupler 15 and is split by the directional coupler into two signals of about the same amplitude but about 90° out-of-phase. These two signals appear at ports 2 and 3, respectively. The two split signals are, in turn, fed into the respective vertical and horizontal inputs V and H of antenna 17. The antenna 17 is a circularly polarized antenna which transmits the two signals as a circularly polarized wave or near circularly polarized wave.

Figure 2:
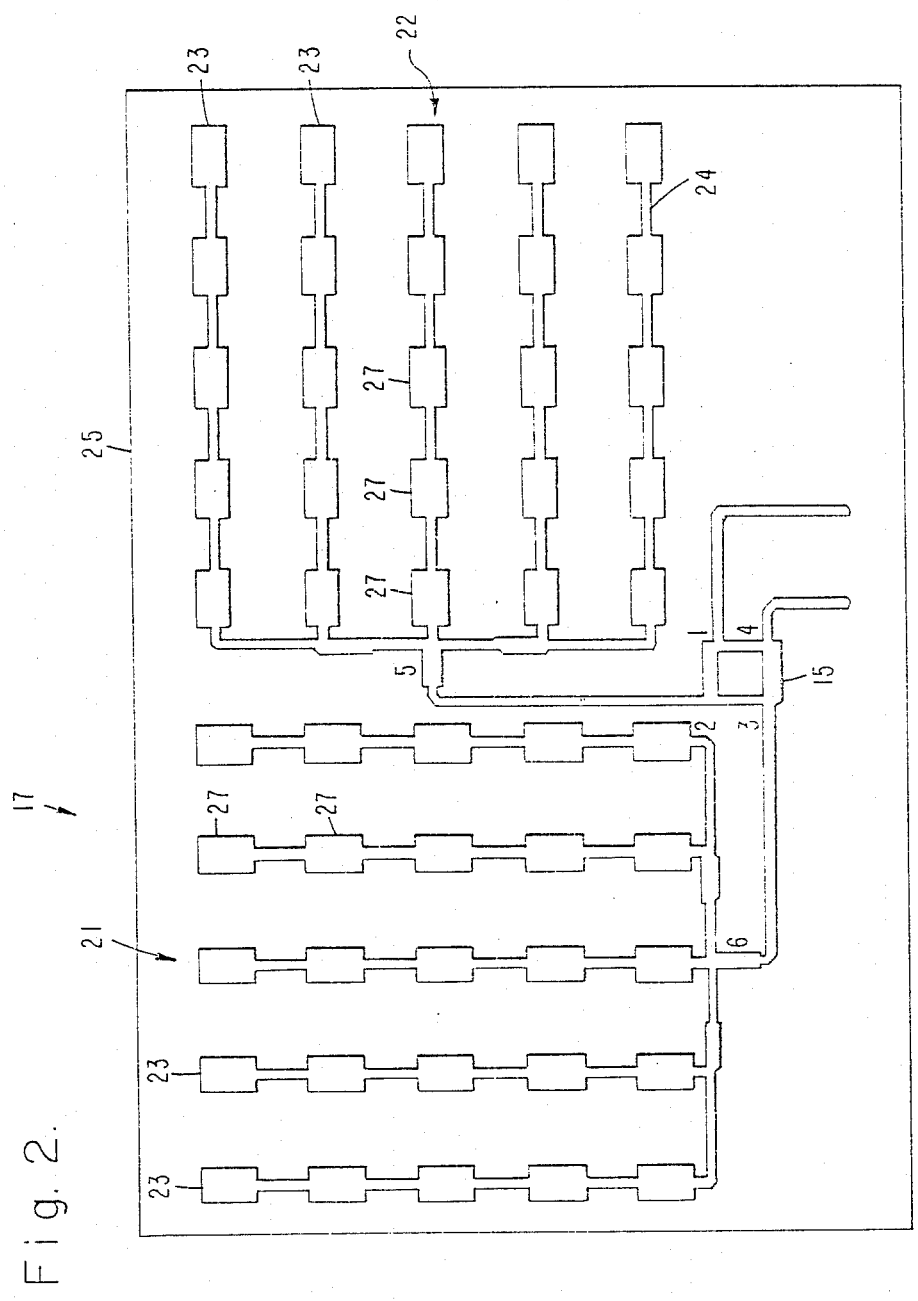
FIG. 2 is a top plan view of an antenna according to the invention.

A horn antenna may be used as the antenna 17; however, a preferred circularly polarized antenna 17 which is entirely monolithic is shown in FIG. 2. Two linearly polarized microstrip antenna arrays 21 and 22 are printed on a dielectric substrate 25. The two microstrip arrays 21 and 22 are arranged orthogonally to each other on the substrate 25 so that one array will radiate a horizontal linearly polarized wave and the other will radiate a vertical linearly polarized wave about 90° out-of-phase with the horizontal polarized wave. At far field, i.e., about ten wavelengths away from the antenna 17, these horizontally and vertically linear polarized beams will form a single circularly polarized waveform or near circularly polarized waveform. To generate a circularly polarized waveform the electrical distance from the respective inputs 5 and 6 of each linear array 21 and 22 to the respective outputs 3 and 4 of the directional coupler 15 should be equal.

Each linear array 21 and 22 may consist of a plurality of stripline conductors 23 (five stripline conductors 23 are shown in each antenna array 21 and 22). Each stripline conductor 23 may consist of a plurality of alternating low impedance patches 27 and high impedance narrow transmission sections 24. The lengths of each patch 27 and narrow section 24 is about one-half wavelength for the operating frequency of the antenna 17. Making each patch 27 and section 24 about one-half wavelength long will produce a beam orthogonal to the plane of the antenna arrays 21 and 22. The number of stripline conductors 23, as well as the number and the geometry of the patches 27, may be varied to achieve the desired radiation pattern and beam width.

The antenna 17 also receives any signals reflected back toward the transceiver 10. Upon reflection by a distant object, the sense of the circularly polarized waveform will be reversed. The two antenna arrays 21 and 22 receive the horizontal and vertical components of the circularly polarized waveform, which signals appear at ports 2 and 3 of the directional coupler 15. The directional coupler 15 recombines the horizontal and vertical components into a single signal which appears at port 4. Little, if any, of the return signal will return toward the oscillator 11 because of phase cancellation. This signal is fed into a mixer 18 which will down-convert the return signal to an intermediate frequency for further signal processing. This intermediate frequency signal appears at output terminal 30. The mixer 18 may comprise a coupler 19, such as a 3-dB branch line coupler or a Lange coupler, and two mixer diodes 20 coupled in series in like polarity between a pair of terminals of the coupler 19. The output terminal 30 is coupled to a point between the diodes 20.

The entire transmitter and antenna can be mounted on a single substrate 25 such as a Duroid substrate, for example. The resultant transceiver and antenna provides a simple and efficient radar system. This system is compact and shock resistant, providing a reliable radar system for use in missiles and vehicle anti-collision applications. This radar receiver will not be "blinded" by the signal of a similar radar with the same sense of circularly polarized waveforms because the mixer "sees" only the reflected signal with a reverse sense of circular polarization.

Although the present invention has been shown and described with respect to a particular embodiment, nevertheless various changes and modifications obvious to a person skilled in the art to which the invention pertains are deemed to lie within the purview of the invention.

What is claimed is:

1. A radar transceiver which comprises:

means for generating a signal;

a directional coupler having first, second, third and fourth branch line terminals, said first branch line terminal being electrically coupled to said signal generating means;

a dielectric substrate;

a first linearly polarized antenna including a plurality of essentially parallel first stripline conductors, each stripline conductor having a first plurality of radiating patches spaced about one-half wavelength apart based on the operating frequency of the transceiver, said stripline conductors being coupled to said second branch line terminal;

a second linearly polarized antenna including a plurality of essentially parallel second stripline conductors, each stripline conductor having a second plurality of radiating patches spaced about one-half wavelength apart based on the operating frequency of the transceiver, said stripline conductors of said second antenna being coupled to said third branch line terminal;

said first and second linearly polarized antennas being mounted on different regions of said substrate and arranged essentially orthogonal to each other, said first linearly polarized antenna being fed a signal from said second branch line terminal and radiating a first signal of a substantially first polarization, and said second linearly polarized antenna being independently fed a second signal from said third branch line terminal and radiating a second independent signal of a substantially second polarization about 90° out-of-phase with said first signal; and a mixer electrically coupled between said signal generating means and said fourth branch line terminal.

2. A transceiver as defined in claim 1 wherein said patches are substantially rectangularly shaped.

* * * * *